(12) United States Patent
Wong et al.

(10) Patent No.: US 11,029,470 B2
(45) Date of Patent: Jun. 8, 2021

(54) FIBER OPTIC ADAPTER WITH DUST SHUTTER ASSEMBLY FOR RECEIVING A FIBER OPTIC CONNECTOR

(71) Applicant: SENKO ADVANCED COMPONENTS, INC, Marlborough, MA (US)

(72) Inventors: Kim Man Wong, Kowloon (HK); Kazuyoshi Takano, Tokyo (JP)

(73) Assignee: Senko Advanced Components, Inc., Marlborough, MA (US)

(*) Notice: Subject to any disclaimer, the term of this patent is extended or adjusted under 35 U.S.C. 154(b) by 0 days.

(21) Appl. No.: 16/699,507

(22) Filed: Nov. 29, 2019

(65) Prior Publication Data
US 2020/0174199 A1 Jun. 4, 2020

Related U.S. Application Data

(60) Provisional application No. 62/774,299, filed on Dec. 2, 2018.

(51) Int. Cl.
G02B 6/38 (2006.01)
(52) U.S. Cl.
CPC .................. *G02B 6/3869* (2013.01)
(58) Field of Classification Search
CPC ..................................................... G02B 6/3869
USPC ......................................................... 385/137
See application file for complete search history.

(56) References Cited

U.S. PATENT DOCUMENTS

| | | | |
|---|---|---|---|
| 5,883,995 | A | 3/1999 | Lu |
| 6,079,881 | A | 6/2000 | Roth |
| 6,179,477 | B1 | 1/2001 | De Marchi |
| 6,247,849 | B1 | 6/2001 | Liu |
| 6,461,054 | B1 | 10/2002 | Iwase |
| 6,550,978 | B2 | 4/2003 | De Marchi |
| 6,561,699 | B1 | 5/2003 | De Marchi |
| 6,685,362 | B2 | 2/2004 | Burkholder et al. |
| D608,285 | S | 1/2010 | Sato et al. |
| 7,785,018 | B2 | 8/2010 | Jones et al. |
| 9,196,997 | B2 | 11/2015 | Sanders et al. |
| 9,279,940 | B2 | 3/2016 | Mamiya et al. |
| 9,453,963 | B2 | 9/2016 | Sato |
| 9,494,746 | B2 | 11/2016 | Sanders et al. |
| 9,632,256 | B2 | 4/2017 | Yang et al. |
| 9,709,754 | B2 | 7/2017 | Sanders et al. |
| 9,791,636 | B1 * | 10/2017 | Carpenter ............ G02B 6/3616 |
| 10,012,799 | B2 | 7/2018 | Sanders et al. |
| 10,101,539 | B2 | 10/2018 | Yang et al. |

(Continued)

FOREIGN PATENT DOCUMENTS

| | | |
|---|---|---|
| CA | 2350703 A1 | 12/2001 |
| EP | 0893716 A1 | 1/1999 |

(Continued)

*Primary Examiner* — Jerry M Blevins
(74) *Attorney, Agent, or Firm* — Edward S. Jarmolowicz, Esq.

(57) ABSTRACT

An array of dust shutter plate connected to a body by a flexible bridge member. The body holds one or more dust shutter plate, a corresponding bridge member, and an actuator that opens the dust shutter or moves the dust shutter plate from a closed position covering an opening in the alignment sleeve holder to an open position, so the connector ferrule can be accepted into an opening at one end of the alignment sleeve holder.

14 Claims, 10 Drawing Sheets

(56) References Cited

U.S. PATENT DOCUMENTS

| | | |
|---|---|---|
| 2005/0286833 A1 | 12/2005 | Kramer et al. |
| 2014/0205244 A1* | 7/2014 | Bradley ............... G02B 6/3885 385/78 |
| 2016/0216456 A1* | 7/2016 | Leigh ................... G02B 6/4296 |
| 2018/0180819 A1 | 6/2018 | Zhu et al. |

FOREIGN PATENT DOCUMENTS

| | | |
|---|---|---|
| EP | 0893718 A1 | 1/1999 |
| JP | 4824608 B2 | 11/2011 |
| WO | 2016201630 A1 | 12/2016 |

\* cited by examiner

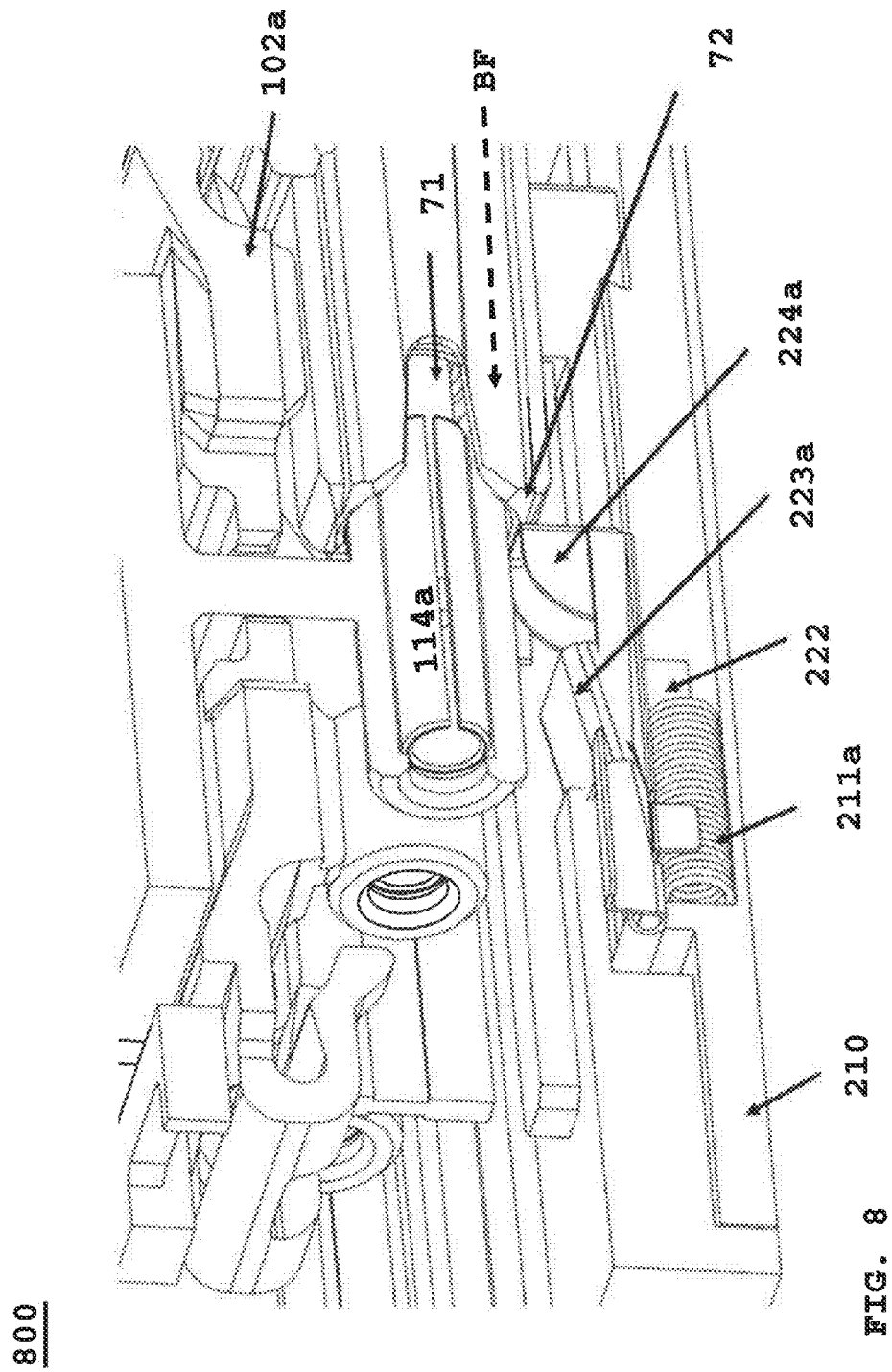

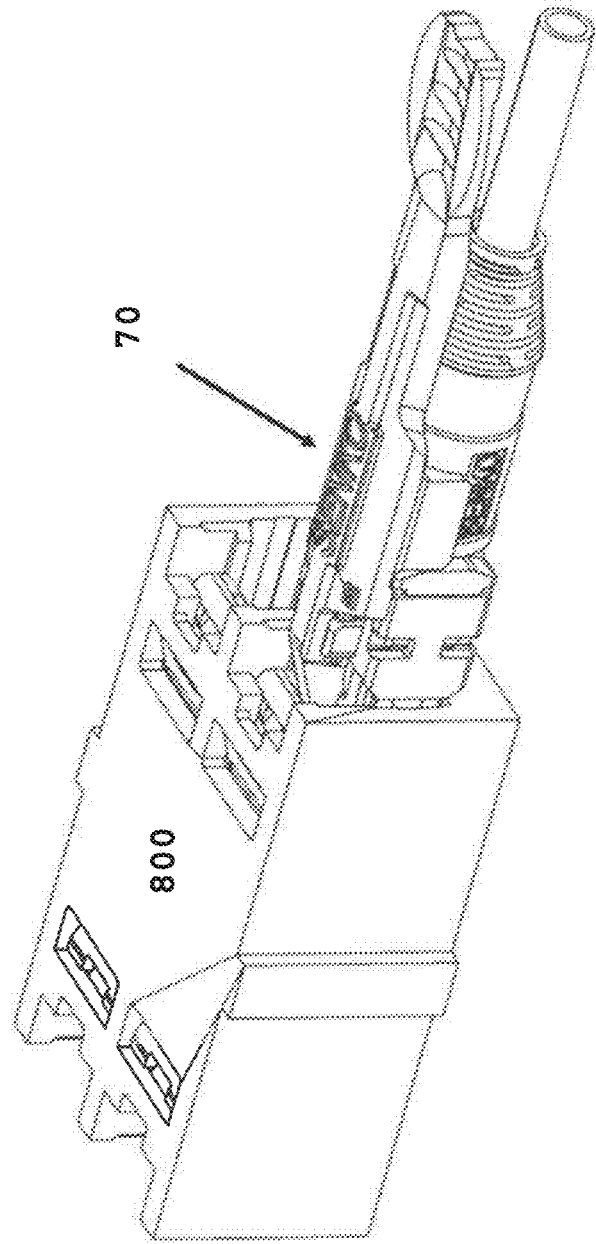

FIBER OPTIC ADAPTER WITH DUST SHUTTER ASSEMBLY FOR RECEIVING A FIBER OPTIC CONNECTOR

CROSS-REFERENCE TO RELATED APPLICATION

The present invention claims priority to U.S. Provisional Patent Application No. 62/774,299, filed on Dec. 2, 2018, the disclosure of which is incorporated by reference herein.

FIELD OF THE INVENTION

The present invention relates to optical adapters configured to receive one or more fiber optic connectors in general and, more particularly, to fiber optic adapters with a dust shutter or shutter assembly formed as part of the adapter housing for protecting an alignment sleeve opening from ingress of dust and other debris. The adapter housing is configured receive one or more fiber optic connectors having at least one optical fiber for transmitting light.

BACKGROUND

Demand for bandwidth by enterprises and individual consumers continues to rise exponentially. To meet this demand, fiber optics have become the standard cabling medium. Fiber optics relies on individual optical fibers of glass or polymers that are on the order of 250 microns in diameter. Data centers use high-density cabling with individual fiber optic cables containing one or more optical fibers. Typically, in these high-density environments, MPO (multiple push on) connectors are used for connecting multiple optical fibers from a single multi-fiber cable. Fiber counts may be, for example, 8, 16, 32, or 64 fibers. MPO optical connectors optical fibers are subject to debris that can interfere with a light signal. The MPO connector is a multi-fiber push-on, push-off connector. The LC connector is a two-ferrule fiber optic connector used in data center applications that likewise can be interfered with by debris being deposited on a ferrule endface that has one or more optical fibers exposed to the environment when not connected opposite another fiber optic connector or transceiver light source.

Further, current optical connectors typically use many small components assembled into a single connector. An example of a prior art connector is depicted in FIG. 1A (exploded view) of MPO fiber optic connector (50) deploying prior art spring (23), and FIG. 1B (exploded view) that depicts second LC type fiber optic connector (60) deploying prior art springs (23). Prior art connectors (50, 60, 70) generally includes dust cap (10a), connector housing (10) that includes ferrule assembly (11,12, 14) biased by one or more spring (23) and back body (15) secured to a distal end of connector housing (10). Springs (23) bias the ferrule assembly forward to ensure a low insertion signal loss between opposing connectors secured within opposing adapter ports (see FIG. 9). A cable boot (20) is secured with crimp ring (19) to a distal end of the back body. A fiber optic cable with one or more optical fibers (17) is passed through the cable boot, the back body and a longitudinal bore formed as part of springs (23). At a distal end of ferrules (11) is a pigtail or short length of optical fiber that optical fiber is spliced with forming a splice point. FIG. 1A connector is disclosed in Applicant's granted U.S. Pat. No. 9,658,408B2 "Optical Fiber Connector with Changeable Polarity", granted May 23, 2017, Gniadek et. al., which is fully incorporated by reference into this application. FIG. 1B connector is disclosed in Applicant's granted U.S. Pat. No. 10,185,100B2, "Modular Connector and Adapter Assembly Using a Removable Anchor Device", granted Jan. 22, 2019, Takano et. al., which is fully incorporated by reference into this application.

Using a prior art dust shutter plate, as disclosed in U.S. Pat. No. 6,561,699B1, "Plug Part of an Optical Plug-And-Socket Connection", granted May 13, 2003 to Inventor De Marchi, at FIG. 15 discloses the shutter plate is forward in an adapter port and could interfere with Applicant's anchor device securing a fiber optic connector within the adapter port.

SUMMARY

A low profile dust shutter plate assembly with at least one dust shutter plate is configured to cover and protect an alignment opening from debris ingress to help prevent distortion of a light signal between opposing optical fiber configured as part of opposing fiber optic connectors within an adapter.

BRIEF DESCRIPTION OF THE DRAWINGS

FIG. 8 depicts a zoomed view of FIG. 7, and

FIG. 9 depicts a perspective view of the fiber optic connector fully inserted into an adapter port.

DETAILED DESCRIPTION

This disclosure is not limited to the particular systems, devices and methods described, as these may vary. The terminology used in the description is for the purpose of describing the particular versions or embodiments only and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below. A connector, as used herein, refers to a device and/or components thereof that connects a first module or cable to a second module or cable. The connector may be configured for fiber optic transmission or electrical signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, an SC duplex connector, an MPO connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable. As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals.

Figure 1A:
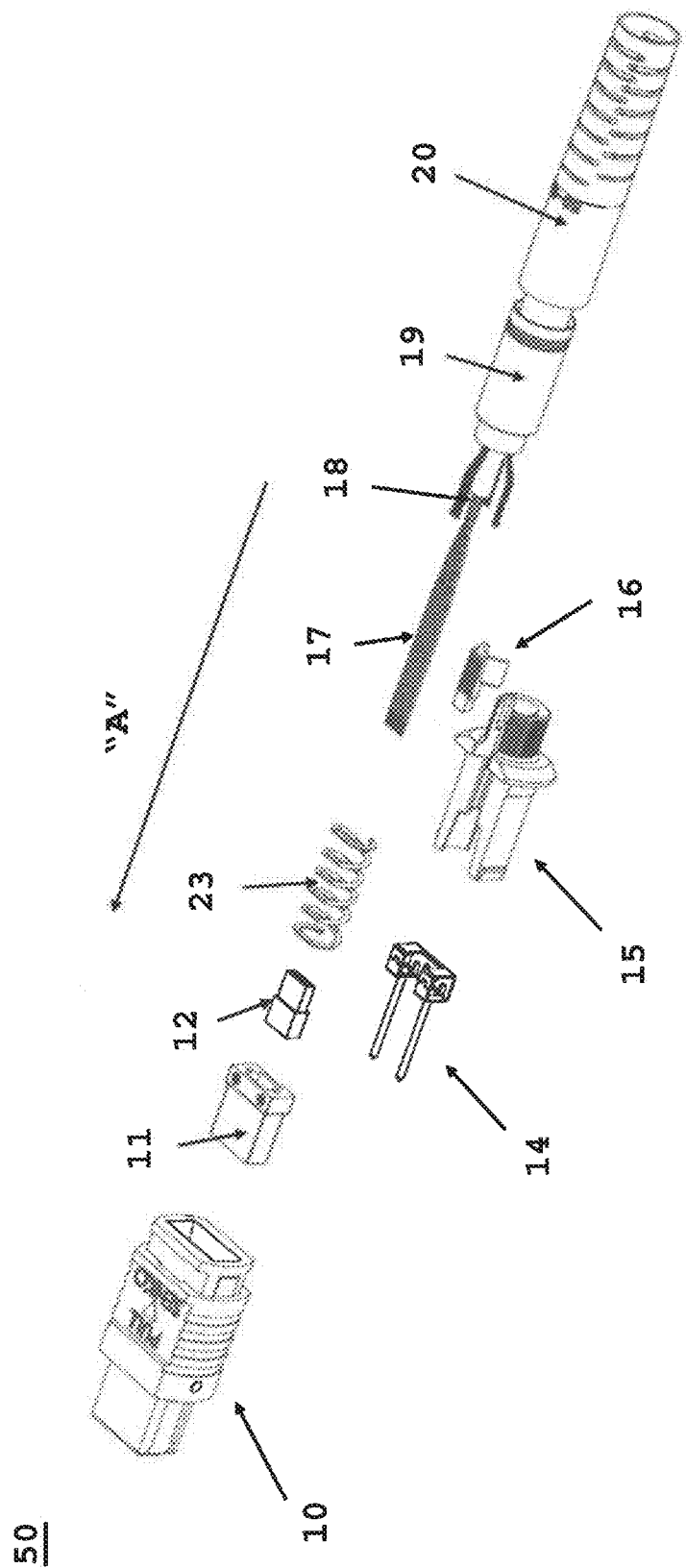
FIG. 1A is an exploded view of a prior art MPO fiber optic connector deploying a prior art bias spring.
Figure 1B:
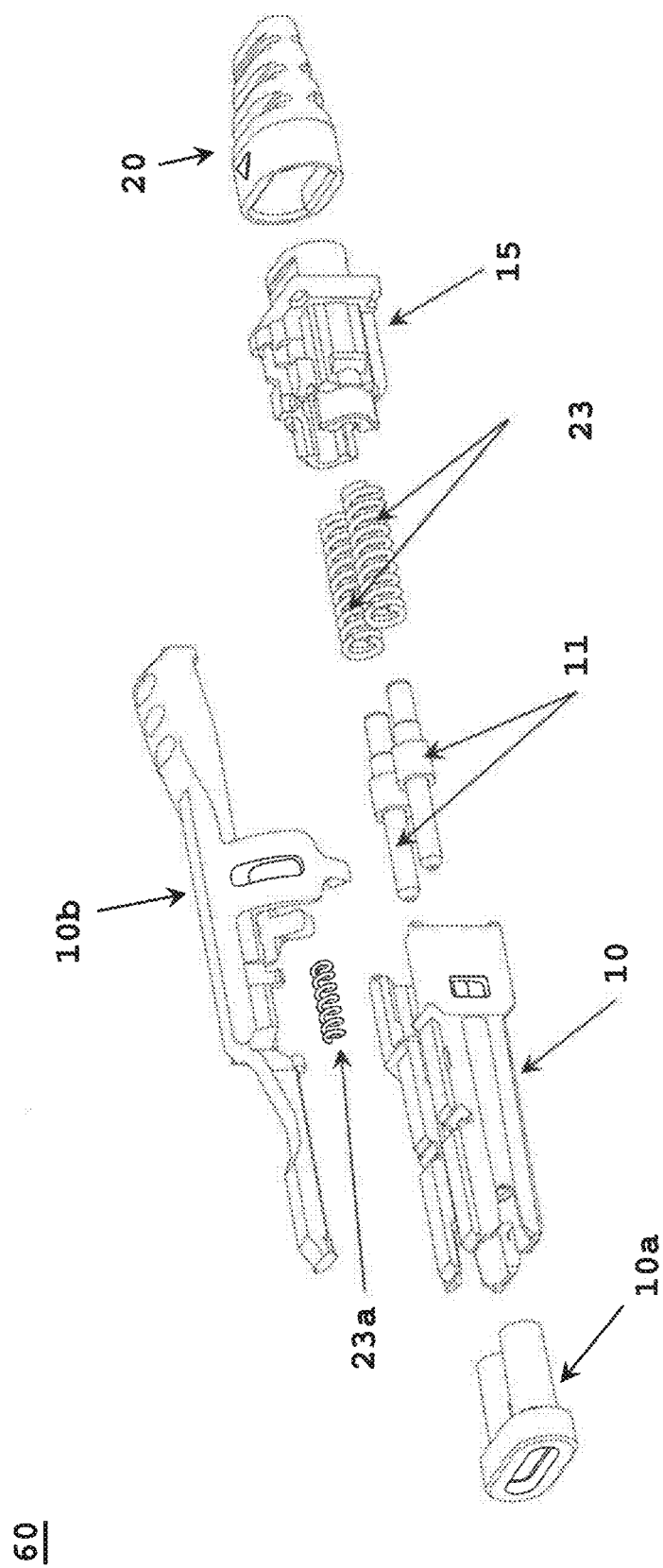
FIG. 1B is an exploded view of a prior art LC type fiber optic connector deploying a prior art bias spring set.
Figure 2:
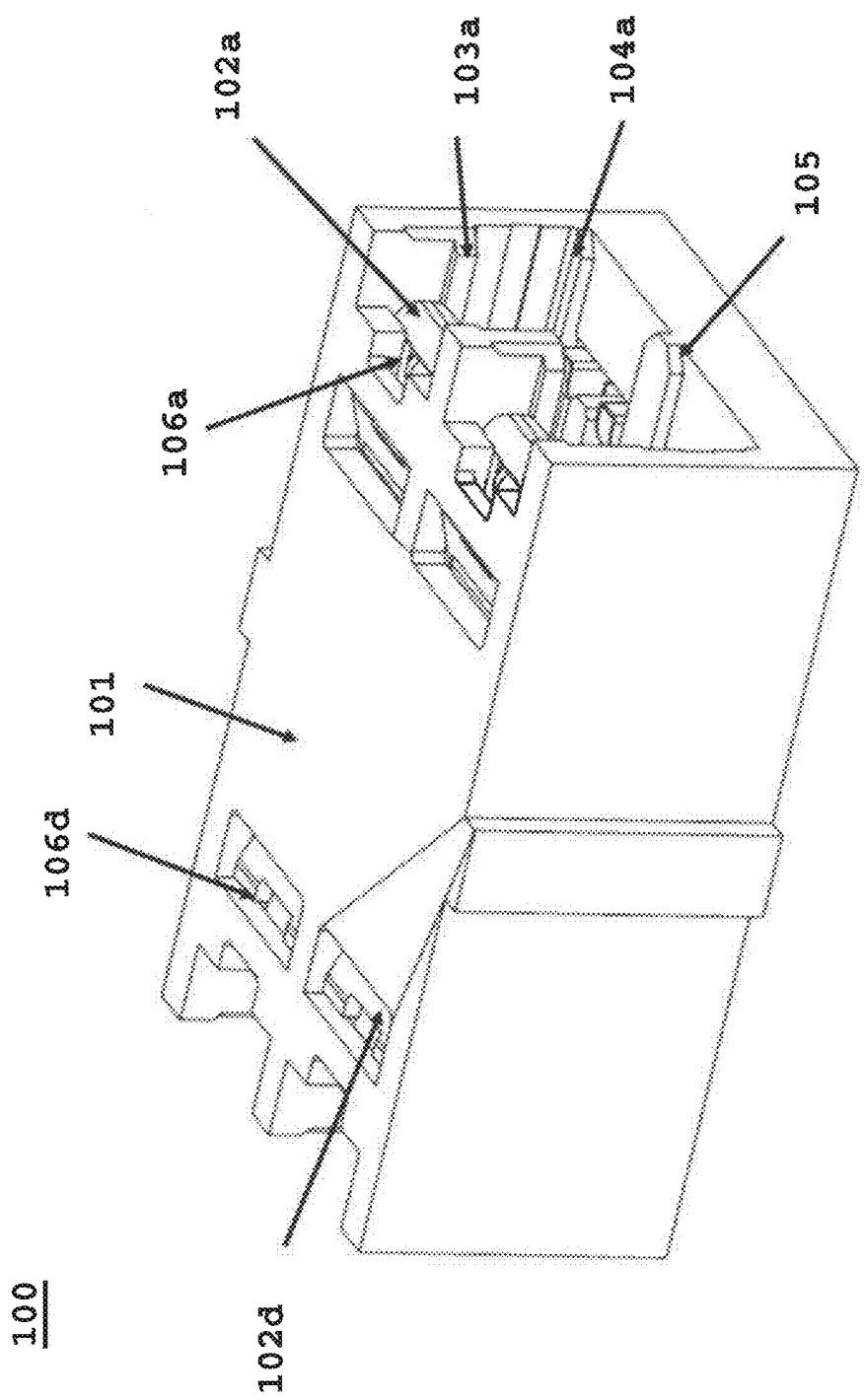
FIG. 2 depicts a prior art adapter with one or more ports configured to accept an anchor device.

FIG. 2 depicts prior art adapter (100) with anchor (102a) device inserted in each adapter port. Adapter housing (101) has structure to retain each anchor device within the port. Retention surface (106a-106d) secures each anchor (102a-102d) device within the port. The anchor device is accepted on opposing rails (103a) when inserted into the adapter port. Fiber optic connector (50, 60, 70) is guided into the adapter port by one or more rails (104a, 105).

Figure 3:
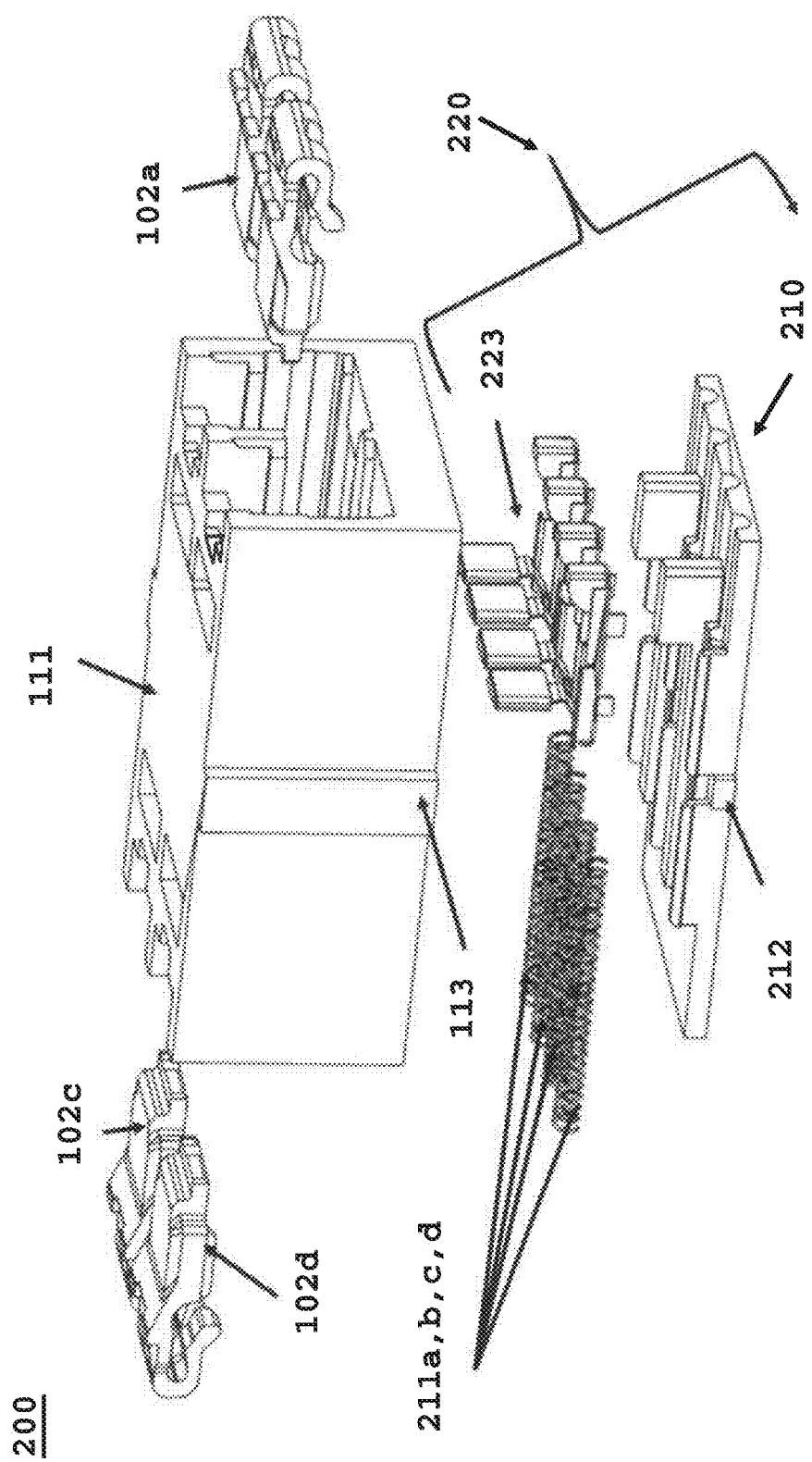
FIG. 3 depicts an exploded view of FIG. 2 deploying an embodiment of the present invention.

FIG. 3 depicts an exploded view of the prior art adapter of FIG. 2 with an embodiment of the present invention, Adapter dust shutter assembly (200). Adapter assembly (200) has upper housing (111) and lower housing (210) secured together by protrusion (212) received in recess (113). Upper housing (111) receives one or more anchor (102a-102d) devices depending on the number of adapter ports. In the present embodiment, four adapter ports are disclosed but there may be less or more without departing from the scope of the invention. Lower housing (210), described further in FIG. 4, accepts dust shutter plate assembly (220) that comprises array of dust shutter plate (223a-223d) (FIG. 4) connected to dust shutter lower housing actuator (224a-224d) by flexible bridge member (225a-225d) (FIG. 5), and the dust shutters are biased closed by bias springs (211a-211d). Each dust shutter (223a-223d) covers an opening or channel formed in alignment sleeve (114a-114d) that accepts a ferrule with at least one optical fiber therein, when the fiber optic connector is fully inserted into an adapter port.

Figure 4:
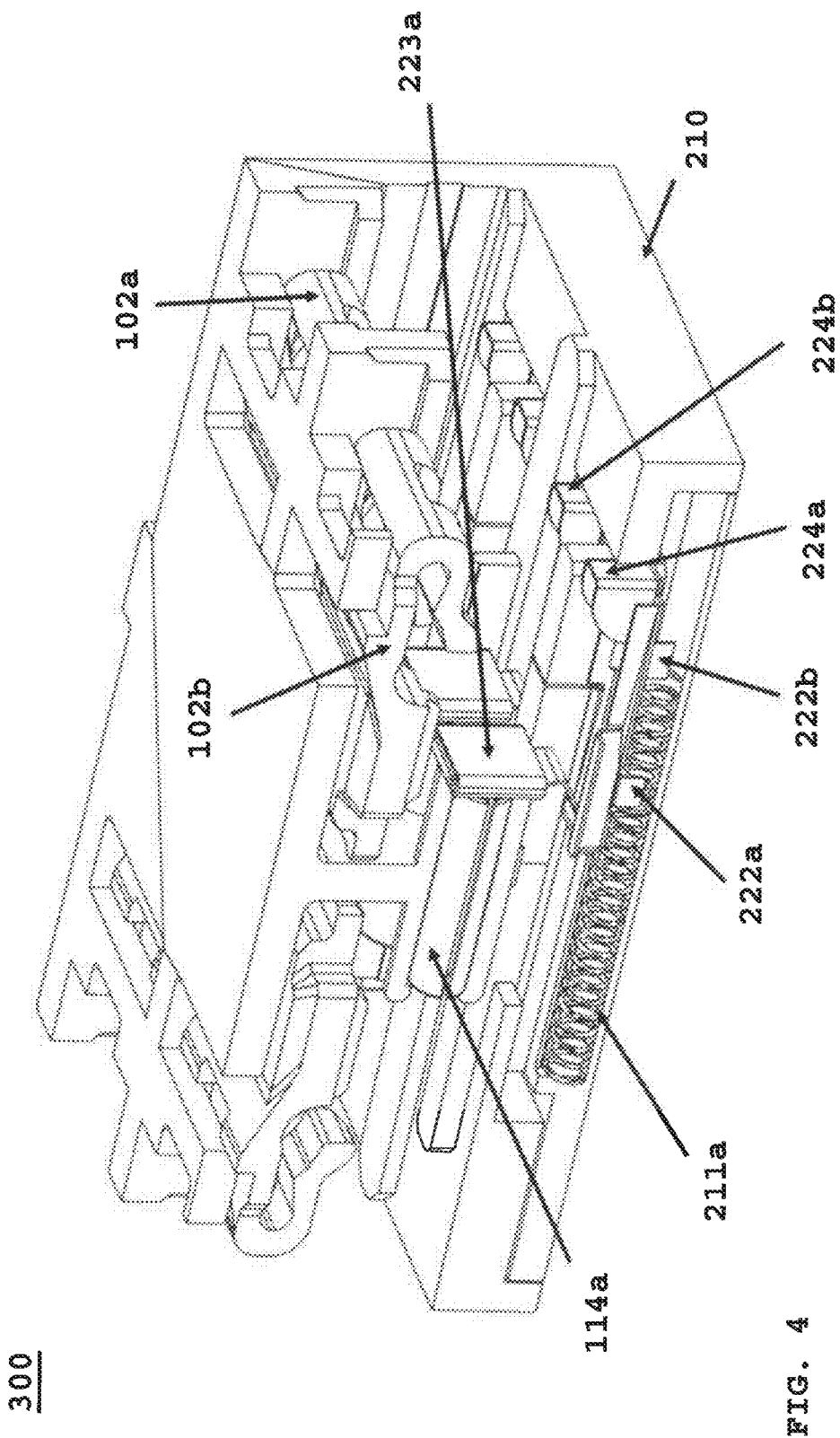
FIG. 4 is a cross-section view of a dust shutter assembly secured within an adapter housing according to the present invention.
Figure 5:
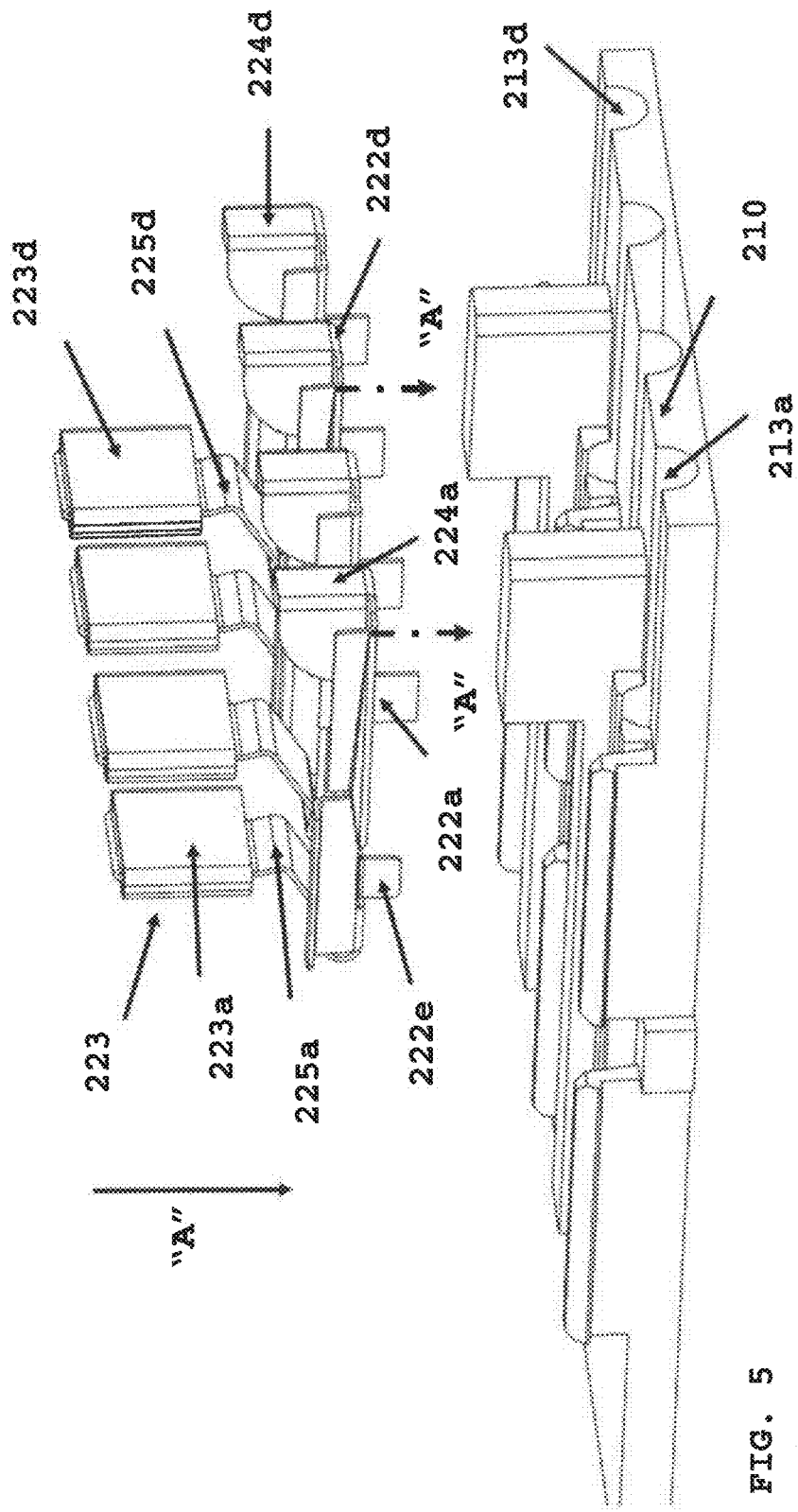
FIG. 5 is an exploded view of an array of dust shutter plate and lower adapter housing.
Figure 6:
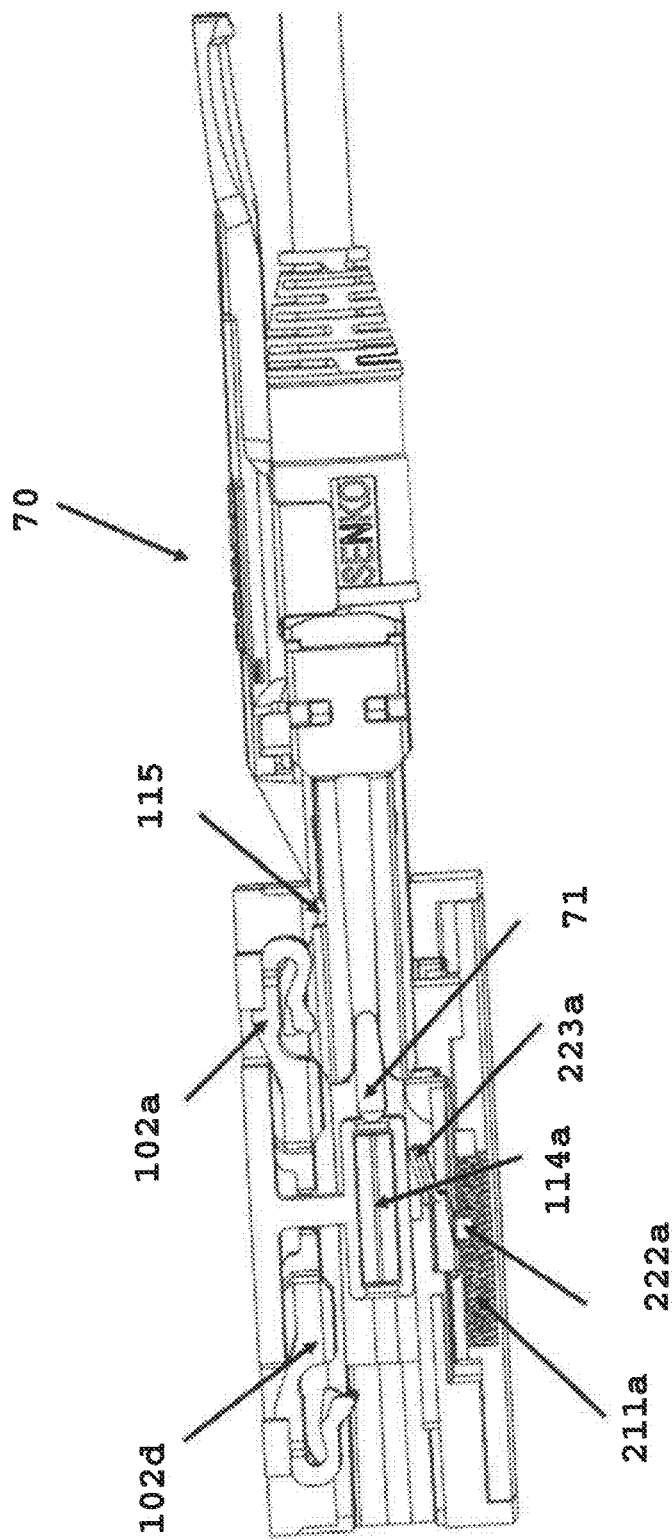
FIG. 6 is a cross-section view of a fiber optic connector inserted into an adapter port.
Figure 7:
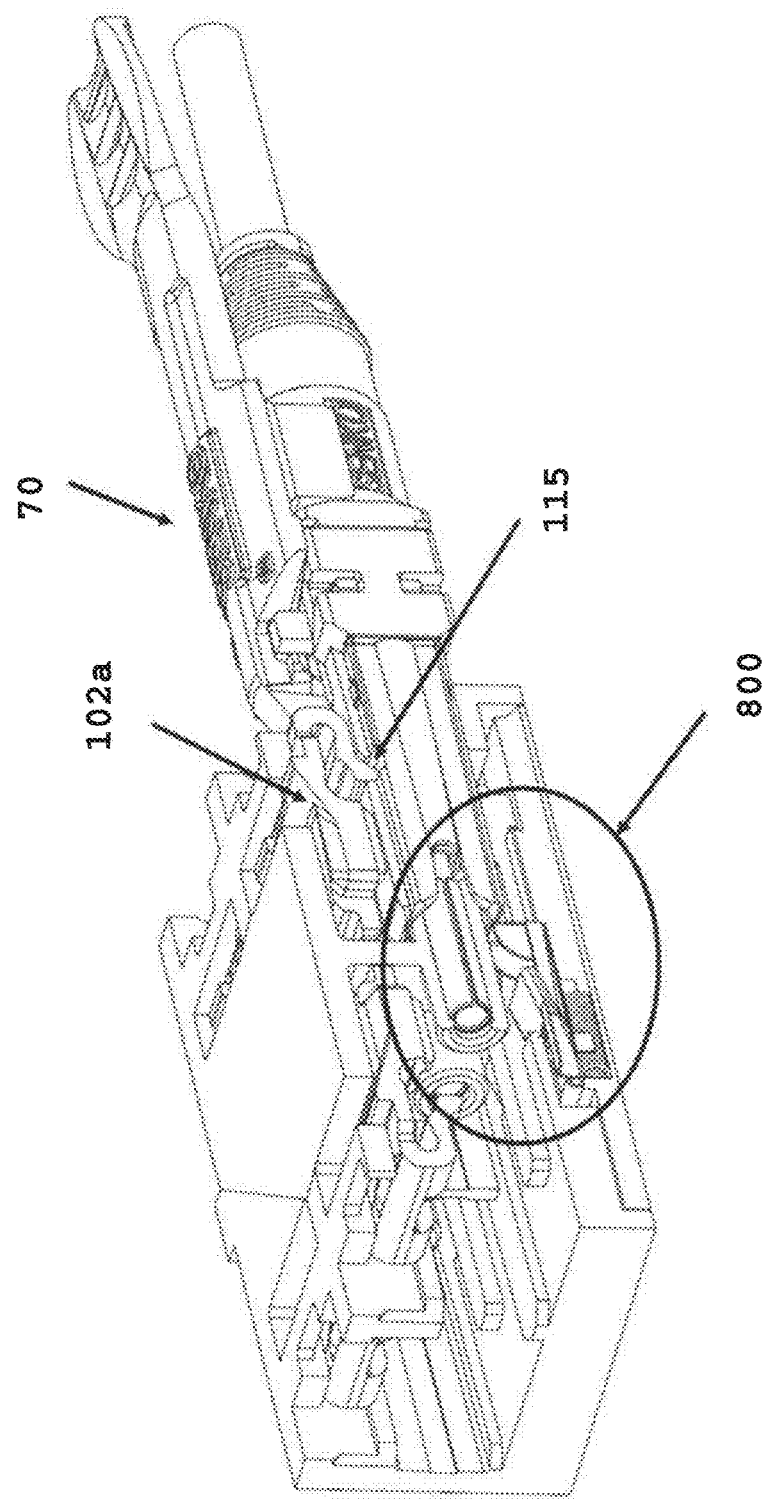
FIG. 7 is a perspective off-set view of the dust shutter assembly closed after full insertion of the fiber optic connector within the adapter port.

FIG. 4 depicts a cut-away view illustrating dust shutter plate (223a) closed over an opening formed on one end of alignment sleeve (114a) that accepts ferule (71) (refer to FIG. 6) when fiber optic connector (70) is fully inserted into an adapter port. Referring to FIG. 4 and FIG. 5, plural of retention tab (222a-222h) engage corresponding bias springs (211a-211d). Retention tab (222a-222h) and actuator (224a-224d) secure and compress each spring (211a-211d) within corresponding slot (213) when fiber optic connector housing (72) engages lower housing actuator (224a-224d) as described below. FIG. 5 depicts assembly of array of dust shutter plate (223) being secured in the direction of "A" to lower housing (210) using one or more retention tab (222) within corresponding slot (213) formed in lower housing (210). Each slot (213a-213d) holds corresponding bias spring (211a-211d). (FIG. 6 illustrates fiber optic connector (70) compressing bias spring (211a) when the connector is inserted into the adapter port. As the connector is inserted into the adapter port, the front of the connector housing lifts the legs of the anchor device, until the anchor device is secured within recess (115) which secures the connector into and adapter port (FIG. 6), until released when the user pulls the push/pull tab. As connector (70) is inserted into the adapter port, dust shutter plate (223a) folds down and under the alignment sleeve when connector housing (72) actuates each lower housing actuator (224a-224d). Actuator (224a-224d) compresses corresponding bias spring (211a-211d). Retention tab (222a) connects to corresponding bias spring (211a) to secure and assist with compressing bias spring (211a) when dust shutter plate is open, after the fiber optic connector is fully inserted into the adapter port (also refer to FIG. 8). FIG. 7 depicts connector (70) fully inserted into the adapter port with anchor (102a) device 210 secured within recess (115). Call-out (800) is zoomed view described in FIG. 8.

FIG. 8 depicts bias spring (211a) fully compressed when connector (70) is secured within adapter port by anchor (102a). Ferrule (71) is fully inserted into alignment sleeve (114a), and dust shutter plate (223a) is open or fully depressed under the alignment sleeve when connector housing (72) maintains bias force ("BF") on the lower housing actuator (224a). FIG. 9 depicts fiber optic connector (70) secured within an adapter deploying the present invention (800).

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). For example, rail (103a) is rail of a first adapter port "a" while rail (103) generally designates a rail for any adapter port.

The invention claimed is:

1. A fiber optic adapter protecting against debris ingress, comprising:
    an adapter housing having a longitudinal axis and defining an adapter port into which a fiber optic connector can be inserted in a forward direction along the longitudinal axis into the fiber optic adapter;
    a dust shutter plate;
    a flexible bridge member, the dust shutter plate connected to the flexible bridge member, wherein the flexible bridge is deformable to move the dust shutter plate between a closed position and an open position;
    a bias spring separate from the flexible bridge member yieldable biasing the dust shutter plate toward the closed position;
    a dust shutter housing actuator integrally connected to the flexible bridge member and connected to the bias spring; and
    an alignment sleeve having an open end for receiving a ferrule of the optical fiber connector when the fiber optic connector is inserted into the port of the adapter housing;
    wherein a front housing of the fiber optic connector actuates the dust shutter plate from the closed position covering the open end of the alignment sleeve to the open position exposing the open end of the alignment sleeve when a ferrule is fully inserted into the alignment sleeve via the opening.

2. The fiber optic adapter according to claim 1, further comprising an anchor device configured to secure the fiber optic connector within a port of the adapter housing.

3. The fiber optic adapter according to claim 2, wherein when the fiber optic connector is secured with the anchor device, the fiber optic connector biases the dust shutter plate open.

4. The fiber optic adapter according to claim 1, wherein the flexible bridge member is connected to the corresponding bias spring using a plurality of retention tabs.

5. The fiber optic adapter according to claim 1, wherein the fiber optic connector is selected from one or more of a LC connector or a MPO connector.

6. The fiber optic adapter according to claim 1, wherein the fiber optic adapter is configured so that the front housing of the fiber optic connector actuates the dust shutter plate at a location inside the adapter port.

7. The fiber optic adapter according to claim 1, wherein the fiber optic adapter is configured so that the front housing of the fiber optic connector pushes the dust shutter housing actuator to slide in translation in the forward direction along the longitudinal axis to actuate the dust shutter plate from the closed position to the open position.

8. The fiber optic adapter according to claim 1, wherein the flexible bridge member comprises a shutter arm portion connected to the dust shutter plate, an actuator arm portion connected to the dust shutter housing actuator, and a hinge portion connecting the shutter arm portion to the actuator arm portion, wherein the flexible bridge member is configured to bend at the hinge portion such that the shutter arm portion moves toward the actuator arm portion as the dust shutter plate moves from the closed position to the open position.

9. The fiber optic adapter according to claim 1, wherein the flexible bridge member is configured to move in the forward direction along the longitudinal axis as the flexible bridge member deforms to move the dust shutter plate between the closed position and the open position.

10. The fiber optic adapter according to claim 1, wherein the dust shutter plate covers the open end of the alignment sleeve inside the adapter port in the closed position and exposes the open end of the alignment sleeve in the open position.

11. The fiber optic adapter according to claim 1, wherein the dust shutter plate is located inside the adapter port in the open position.

12. A dust shutter plate assembly, comprising:
    a housing with a plurality of slots;
    a retention tab received in each slot,
    a bias spring; the retention tab retaining the bias spring within a corresponding slot and the retention tab being movable along a longitudinal axis within the slot;
    an actuator, the retention tab being secured to one side of the actuator;
    a flexible bridge member, the actuator being connected to the flexible bridge member,
    a dust shutter plate, the flexible bridge member being connected to the dust shutter plate; and
    wherein the bias spring forces the dust shutter plate closed over an opening formed in an alignment sleeve;
    wherein the bias spring comprises a compression spring configured to be compressed along the longitudinal axis.

13. The dust shutter plate assembly according to claim 12, wherein the actuator moves the dust shutter plate to a second position exposing the opening formed in the alignment sleeve thereby allowing ferrule within a fiber optic connector housing to be inserted into the opening.

14. The dust shutter plate assembly according to claim 13, wherein the actuator is positioned to be engaged by a front portion of the fiber optic connector housing to move the dust shutter plate in the second position.

\* \* \* \* \*